(12) United States Patent
Li

(10) Patent No.: US 7,804,658 B1
(45) Date of Patent: Sep. 28, 2010

(54) BIASING RMR WITH CONSTANT POWER

(75) Inventor: Kan Li, Singapore (SG)

(73) Assignee: Marvell International Ltd., Hamilton (BM)

( * ) Notice: Subject to any disclaimer, the term of this patent is extended or adjusted under 35 U.S.C. 154(b) by 453 days.

(21) Appl. No.: 11/899,897

(22) Filed: Sep. 6, 2007

Related U.S. Application Data

(60) Provisional application No. 60/825,193, filed on Sep. 11, 2006.

(51) Int. Cl.
*G11B 5/03* (2006.01)
(52) U.S. Cl. ........................................ 360/66
(58) Field of Classification Search .................. 360/66, 360/46, 31, 67, 68; 324/252; 330/277, 257, 330/252
See application file for complete search history.

(56) References Cited

U.S. PATENT DOCUMENTS

| | | | | |
|---|---|---|---|---|
| 4,492,997 A | * | 1/1985 | Arai et al. .................... 360/67 |
| 5,986,839 A | * | 11/1999 | Klaassen et al. ............. 360/66 |
| 6,078,454 A | * | 6/2000 | Takahashi et al. ............ 360/66 |
| 6,101,056 A | * | 8/2000 | Klaassen et al. ............. 360/66 |
| 6,114,905 A | * | 9/2000 | Hashimoto et al. .......... 330/252 |
| 6,163,218 A | * | 12/2000 | Hashimoto et al. .......... 330/257 |
| 6,218,903 B1 | * | 4/2001 | Hashimoto et al. .......... 330/277 |
| 6,225,802 B1 | * | 5/2001 | Ramalho et al. ............. 324/252 |
| 6,377,411 B1 | * | 4/2002 | Katsumata et al. ............ 360/46 |
| 6,633,446 B1 | * | 10/2003 | Sako ........................... 360/67 |
| 6,775,078 B2 | * | 8/2004 | Jiang ........................... 360/46 |
| 6,847,513 B2 | | 1/2005 | Clapp, III et al. ............. 361/58 |
| 6,909,569 B2 | * | 6/2005 | Makita et al. ................. 360/66 |
| 6,930,531 B2 | | 8/2005 | Barnett ........................ 327/346 |
| 6,947,238 B2 | * | 9/2005 | Takayoshi et al. ............ 360/66 |
| 2002/0048110 A1 | * | 4/2002 | Sako et al. .................... 360/68 |
| 2007/0211364 A1 | * | 9/2007 | Dean .......................... 360/67 |
| 2008/0062551 A1 | * | 3/2008 | Dolan et al. .................. 360/31 |

* cited by examiner

*Primary Examiner*—Fred Tzeng

(57) ABSTRACT

An RMR is biased with constant power. Voltages are applied across at least two variable resistors, which are coupled on opposing ends of the RMR, to establish a current to the RMR, wherein the current is based on the voltages and on resistance values of the at least two variable resistors. A voltage corresponding to the established current of the RMR is amplified. The amplified voltage is compared to a reference voltage, wherein the reference voltage is based on a target power for the RMR. The resistance values of the at least two variable resistors are modified so that the amplified voltage approaches the reference voltage. Modifying the resistance values of the at least two variable resistors in this manner is seen to bias the RMR with constant power, since the reference voltage is based on a target power for the RMR.

44 Claims, 8 Drawing Sheets

BIASING RMR WITH CONSTANT POWER

CROSS-REFERENCE TO RELATED APPLICATION

This application claims the benefit of U.S. Provisional Patent Application No. 60/825,193, filed Sep. 11, 2006, the contents of which are hereby incorporated by reference as if fully stated herein.

BACKGROUND

1. Field of the Invention

The invention relates to magneto-resistive (MR) heads, and more particularly to biasing a resistive element (RMR) of the MR head with constant power.

2. Description of the Related Art

A magneto-resistive (MR) head typically has a resistive element (RMR). Because of the nature of an MR head, it is difficult to supply constant power to the RMR of the MR head. While it may be possible to supply constant current to the RMR, constant current does not necessarily ensure constant power.

One solution involves implementing a multiplier to multiply current of the RMR (Irmr) by voltage of the RMR (Vrmr). However, multipliers are generally difficult to implement with accuracy and stability, particularly at low cost.

SUMMARY OF THE INVENTION

The present invention is seen to address the foregoing deficiencies and considerations related to supplying constant power to an RMR.

According to one aspect of the invention, an RMR is biased with constant power. Voltages are applied across at least two variable resistors, which are coupled on opposing ends of the RMR, to establish a current to the RMR, wherein the current is based on the voltages and on resistance values of the at least two variable resistors. The applied voltages are preferably fixed voltages. A voltage corresponding to the established current of the RMR is amplified. The amplified voltage is compared to a reference voltage, wherein the reference voltage is based on a target power for the RMR. The resistance values of the at least two variable resistors are modified so that the amplified voltage approaches the reference voltage. Modifying the resistance values of the at least two variable resistors in this manner is seen to bias the RMR with constant power, since the reference voltage is based on a target power for the RMR.

The voltages can be associated with a dummy resistance value, and the dummy resistance value can provide a reference resistance for the RMR. The reference voltage can be selected from a bit-selectable threshold. The voltages can be applied using operational amplifiers. In addition, the resistance values of the at least two variable resistors can be between 20 to 40 times greater than a resistance value of the RMR.

In amplifying the voltage corresponding to the established current, the voltage can be gain amplified using the resistance values of the at least two variable resistors and an additional resistance value. The voltage can also be amplified using switch cab amplification.

According to another aspect of the invention, an RMR is biased with constant power. A current to the RMR is generated. A voltage corresponding to the generated current of the RMR is amplified. The amplified voltage is compared to a reference voltage, wherein the reference voltage is based on a target power for the RMR. The amplified voltage is adjusted to approach the reference voltage.

Voltages can be applied across at least two variable resistors, which are coupled on opposing ends of the RMR, to generate the current to the RMR, and the current can be based on the voltages and on resistance values of the at least two variable resistors. In adjusting the amplified voltage, the resistance values of the at least two variable resistors can be modified so that the amplified voltage approaches the reference voltage.

The voltages can be associated with a dummy resistance value, and the dummy resistance value can provide a reference resistance for the RMR. The voltages can be applied using operational amplifiers. The resistance values of the at least two variable resistors can be between 20 to 40 times greater than a resistance value of the RMR.

In amplifying the voltage, the voltage can be gain amplified using the resistance values of the at least two variable resistors and an additional resistance value. The voltage can be amplified using switch cab amplification. The reference voltage can be selected from a bit-selectable threshold.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION

Figure 1:
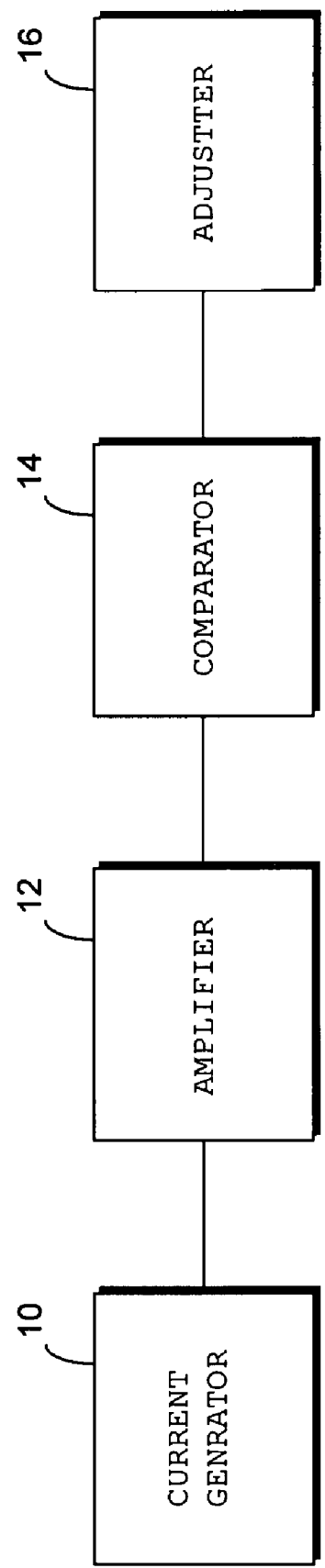
FIG. 1 is a block diagram depicting an apparatus for biasing RMR with constant power, in accordance with an embodiment of the invention.

FIG. 1 is a block diagram depicting a system for biasing RMR with constant power, in accordance with an embodiment of the invention. The apparatus includes a current generator 10 for generating a current to the RMR. In doing so, current generator 10 can apply voltages across at least two variable resistors, which are coupled on opposing ends of the RMR, to generate the current to the RMR, where the current is based on the voltages and on resistance values of the at least two variable resistors. The voltages are preferably fixed.

In this regard, the voltages can be associated with a dummy resistance value, and the dummy resistance value can provide a reference resistance for the RMR. The voltages can be applied using operational amplifiers. In addition, the resistance values of the at least two variable resistors can be between 20 to 40 times greater than a resistance value of the RMR. Further, the reference voltage can be selected from a bit-selectable threshold.

The apparatus of FIG. 1 also includes an amplifier 12 for amplifying a voltage corresponding to the generated current of the RMR. Amplifier 12 can use gain amplification to amplify the voltage, the gain amplification using the resistance values of the at least two variable resistors and an additional resistance value. Additionally, the voltage can be amplified using switch cab amplification.

The apparatus of FIG. 1 also includes a comparator 14 for comparing the amplified voltage to a reference voltage, wherein the reference voltage is based on a target power for the RMR.

In addition, the apparatus of FIG. 1 includes an adjuster 16 for adjusting the amplified voltage to approach the reference voltage. The adjuster can modify the resistance values of the at least two variable resistors so that the amplified voltage approaches the reference voltage.

Figure 2:
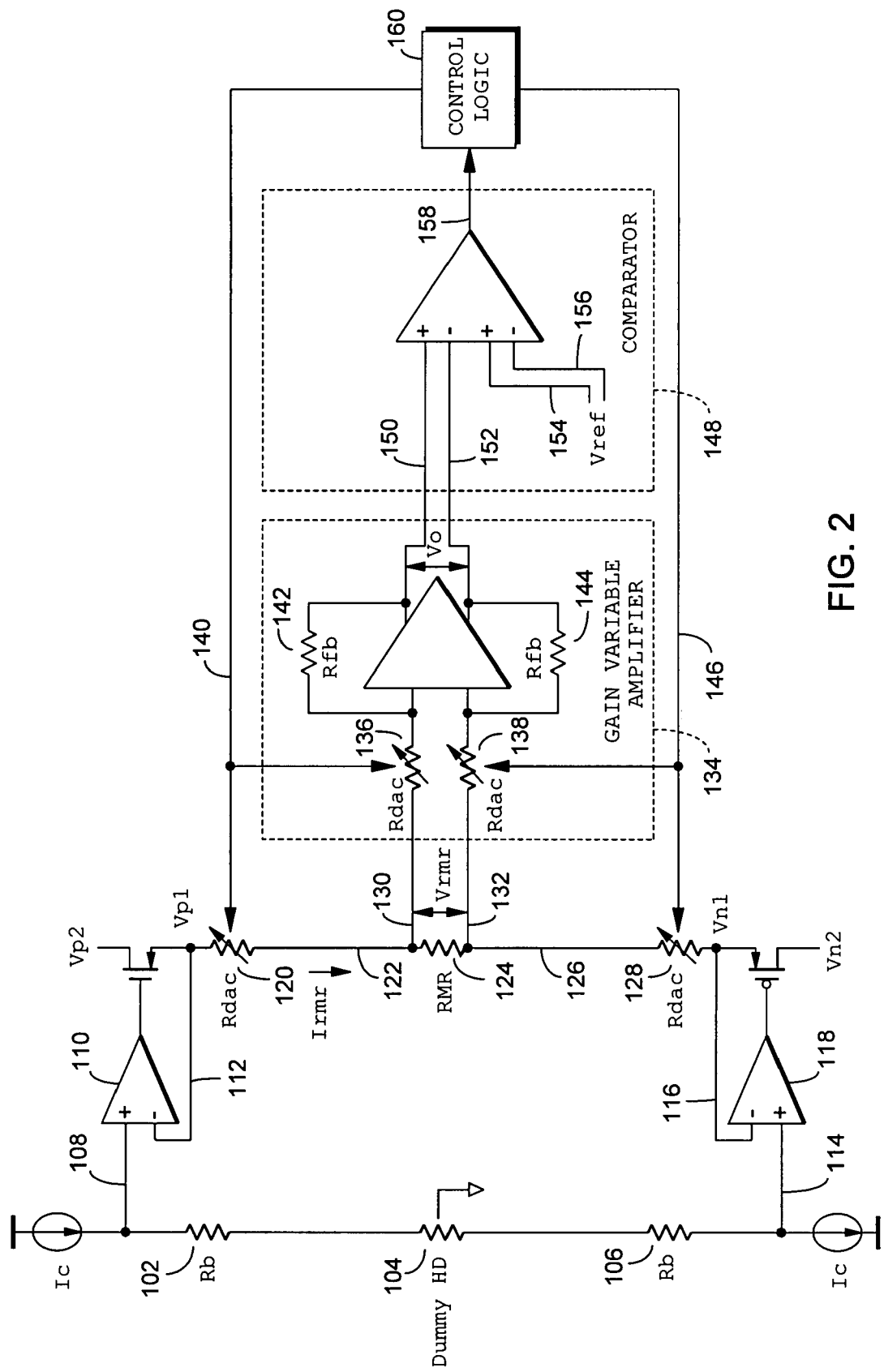
FIG. 2 is an electrical schematic diagram for biasing RMR with constant power, in accordance with another embodiment of the invention.

FIG. 2 is an electrical schematic diagram for biasing an RMR with constant power, in accordance with another embodiment of the invention. In FIG. 2, RMR 124 represents a resistive element of an MR head.

Briefly, FIG. 2 depicts two operational amplifiers 110 and 118, and two variable resistors 120 and 128 coupled on opposing ends of RMR 124. Operational amplifiers 110 and 118 respectively apply fixed voltages Vp1 and Vn1 to variable resistors 120 and 128, to establish a current Irmr to RMR 124. Irmr is based on fixed voltages Vp1 and Vn1, and on resistance values Rdac of variable resistors 120 and 128. A variable gain amplifier 134 amplifies a voltage Vrmr corresponding to Irmr and outputs an amplified voltage $V_0$. A comparator 148 compares the amplified voltage $V_0$ to a reference voltage Vref, which is based on a target power for the RMR 124. Control logic unit 160 modifies the resistance values Rdac so that amplified voltage $V_0$ approaches reference voltage Vref. A more detailed description of FIG. 2 is now provided.

In FIG. 2, a voltage is applied via lines 108 and 114 to the positive input terminals of operational amplifiers 110 and 118. The value of the voltage is as follows:

$$\text{Voltage} = Ic \cdot \left(Rb + \frac{Rdh}{2}\right) \quad \text{(Formula 1)}$$

where Ic represents an input current, Rb represents a resistance value at resistors 102 and 106, and Rdh represents a resistance value at a resistive element of a dummy MR head 104. It should be noted that the dummy MR head may be omitted, since RMR is typically a small value.

The negative input for operational amplifiers 110 and 118 via lines 112 and 116 respectively correspond to voltage values Vp1 and Vn1. Accordingly, by nature of the operational amplifiers 110 and 118, voltage Vp1 can be calculated as follows:

$$Vp1 = Ic\left(Rb + \frac{Rdh}{2}\right) \quad \text{(Formula 2)}$$

Voltage Vn1 can be calculated in a similar manner. As such, it can be seen that both of voltages Vp1 and Vn1 are fixed voltages.

Fixed voltages Vp1 and Vn1 are applied across variable resistors 120 and 128, respectively. The resistance values of variable resistors 120 and 128 are depicted as Rdac. In this regard, it can be assumed that Rdac>>RMR, and more specifically that Rdac is approximately 20 to 40 times greater than RMR.

Given this assumption, current Irmr to RMR 124 via lines 122 and 126 can be calculated as follows:

$$Irmr \approx \frac{Vp1}{Rdac} \Longrightarrow Rdac = \frac{Vp1}{Irmr} \quad \text{(Formula 3)}$$

The voltage Vrmr across RMR 124 is then amplified using a variable gain amplifier 134. Variable gain amplifier 134 takes Vrmr, which corresponds to Irmr, as input via lines 130 and 132, and produces an amplified voltage $V_0$ as output. In addition, variable gain amplifier 134 includes resistors 142 and 144, each having a resistance value Rfb. The amplified voltage $V_0$ can be calculated as follows:

$$V_0 = Vrmr \cdot \text{Gain} = Vrmr \cdot \frac{Rfb}{Rdac} = Vrmr \cdot \frac{Rfb}{Vp1/Irmr} = \quad \text{(Formula 4)}$$
$$Vrmr \cdot Irmr \cdot \frac{Rfb}{Vp1} = Vrmr \cdot Irmr \cdot \frac{Rfb}{IcRb} = \text{Power} \cdot \frac{Rfb}{IcRb}$$

where Rdac represents the resistance value of resistors 136 and 138, which is the same as the resistance value across resistors 120 and 128. As can be seen from Formula (4), $V_0$ represents Power times a factor $$\frac{Rfb}{IcRb}.$$

The amplified voltage $V_0$ is then compared to a reference voltage Vref using comparator unit 148. Comparator 148 takes $V_0$ as input via lines 150 and 152, and takes Vref as input via lines 154 and 156.

Reference voltage Vref is based on a target power for the RMR, and is preferably set according to the biasing power programming. More specifically, Vref can be selected based on the factor $$\frac{Rfb}{IcRb}.$$

The selection can be from a bit-selectable threshold, such as 4 bits (i.e., Power[4:0]). Accordingly, Vref can be calculated as follows:

$$Vref = \text{Power}[4:0] * \text{power\_lsb} * \frac{Rfb}{IcRb}, \quad \text{(Formula 5)}$$

where power_lsb is equal to power(mW)/bit. The output 158 of comparator 148 drives the control logic unit 160, which in turn adjusts resistance values Rdac up and/or down via lines 140 and 146. The adjustment of Rdac changes the values of current Irmr and amplified voltage $V_O$. Control logic unit 160 continues to change Rdac until $V_O$=Vref. At this point, power at RMR 124 can be calculated as follows:

$$\text{Power=Power[4:0]*power\_lsb} \qquad \text{(Formula 6)}$$

Accordingly, modifying the resistance values Rdac of variable resistors 120 and 128 in this manner is seen to bias RMR 124 with constant power, particularly since the reference voltage $V_O$ is based on a target power for RMR 124.

Figure 3:
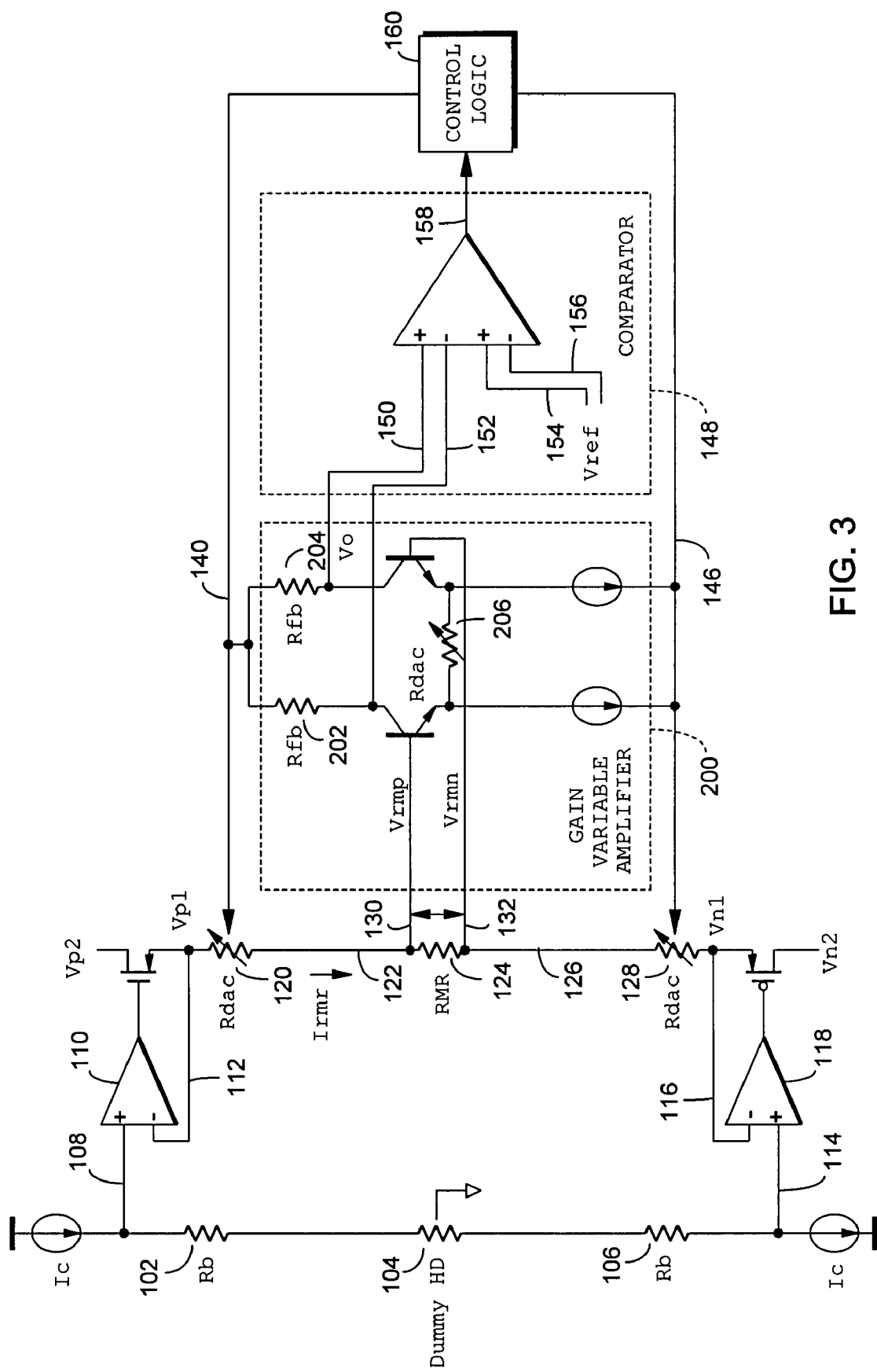
FIG. 3 is an electrical schematic diagram for biasing RMR with constant power, in accordance with yet another embodiment of the invention.

FIG. 3 is an electrical schematic diagram for biasing an RMR with constant power, in accordance with yet another embodiment of the invention. This embodiment is similar to the embodiment depicted in FIG. 2, and as such, similar components have been assigned the same reference numerals. However, in the embodiment of FIG. 3, variable gain amplifier 200 replaces variable gain amplifier 134 of FIG. 2.

Variable gain amplifier 200 takes Vrmp and Vrmn (which correspond to positive and negative Vrmr, respectively) as input via lines 130 and 132, and produces an amplified voltage $V_O$ as output. In addition, variable gain amplifier 200 includes resistors 202 and 204, each having resistance value Rfb, and a resistor 206 having resistance value Rdac. The amplified voltage $V_O$ can be calculated in the same manner as discussed above with reference to FIG. 2.

The replacement of variable gain amplifier 134 with variable gain amplifier 200 is seen to reduce error current associated with variable gain amplifier 134. It should be noted that other amplifiers can be used to replace variable gain amplifier 134 or 200. For example, a switched cab amplifier can be used. The only requirement is that the replacement amplifier be a variable gain amplifier.

Figure 4:
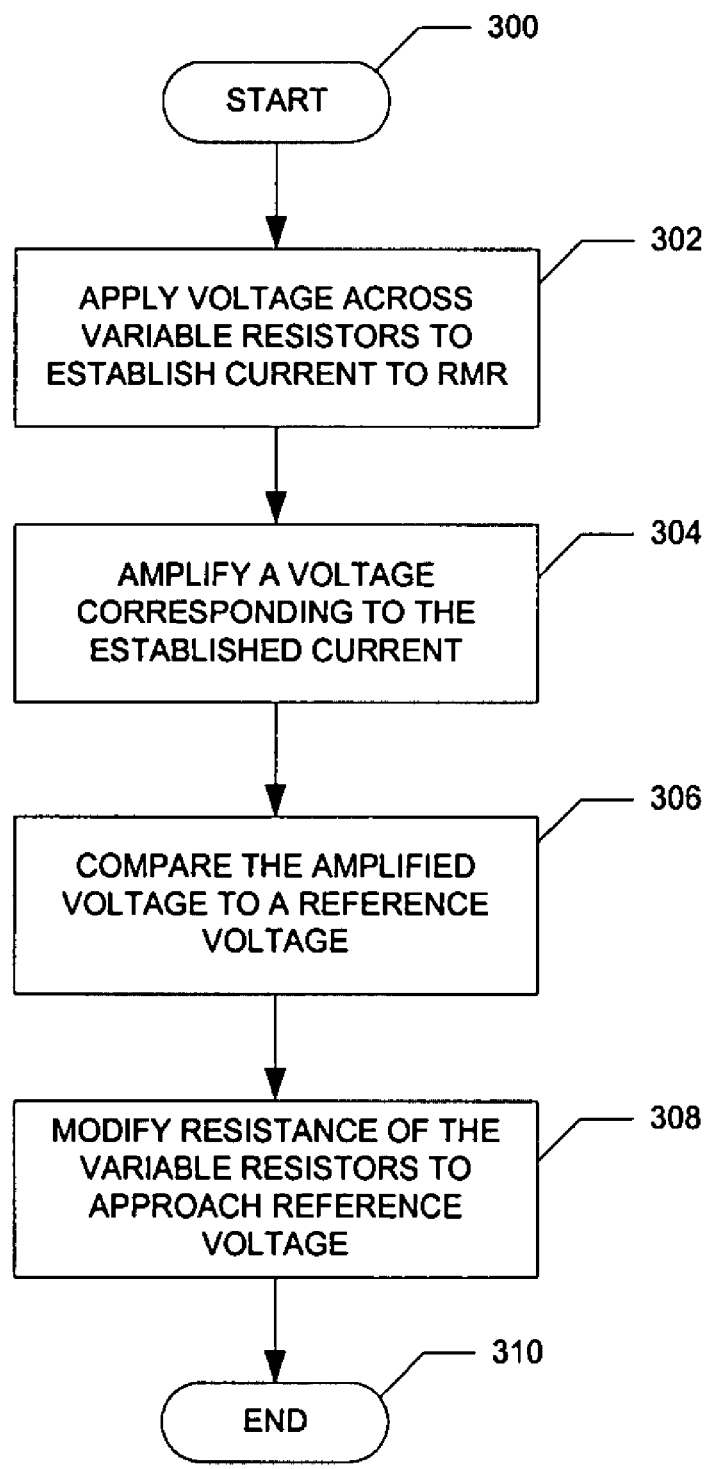
FIG. 4 is a flowchart depicting the biasing of an RMR circuit with constant power, in accordance with a representative embodiment of the invention.

FIG. 4 is a flowchart depicting the biasing of an RMR circuit with constant power, in accordance with a representative embodiment of the invention. Following start bubble 300, a voltage, which is preferably fixed, is applied across at least two variable resistors to establish current to the RMR (block 302). The at least two variable resistors are coupled on opposing ends of the RMR, to establish a current to the RMR. In addition, the current is based on the voltages and on resistance values of the at least two variable resistors.

Preferably, the voltages are applied using operational amplifiers, and the resistance values of the at least two variable resistors are between 20 to 40 times greater than a resistance value of the RMR. In addition, the voltages can be associated with a dummy resistance value, which provides a reference resistance for the RMR. However, a dummy resistance value is not necessary, since the RMR value is relatively small.

Next, a voltage corresponding to the established current of the RMR is amplified (block 304). The voltage is preferably gain amplified using the resistance values of the at least two variable resistors and an additional resistance value.

The amplified voltage is then compared to a reference voltage (block 306), where the reference voltage is based on a target power for the RMR. The reference voltage can be selected from a bit-selectable threshold. The resistance values of the at least two variable resistors are then modified so that the amplified voltage approaches the reference voltage (block 308), and the process ends (end bubble 310).

Figure 5B:
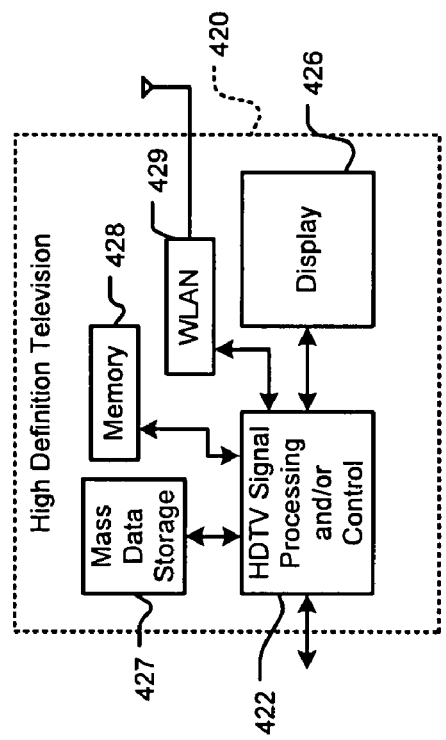
FIG. 5B is a block diagram showing an embodiment of the invention in a high definition television (HDTV).
Figure 5A:
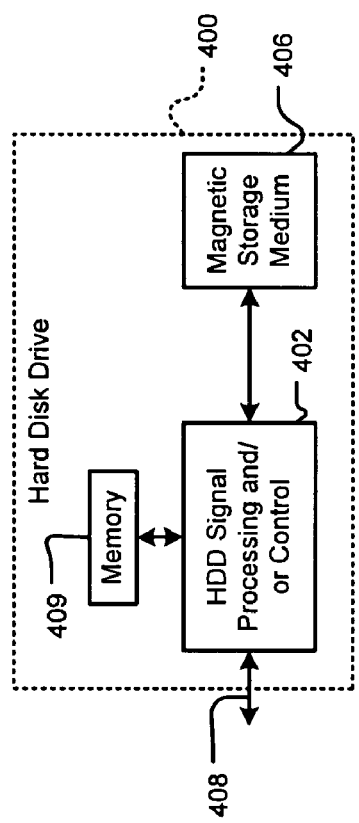
FIG. 5A is a block diagram showing an embodiment of the invention in a hard disk drive (HDD).

Referring now to FIGS. 5A to 5G, various exemplary implementations of the present invention are shown. Referring to FIG. 5A, the present invention may be embodied in a hard disk drive 400. The present invention may implement either or both signal processing and/or control circuits, which are generally identified in FIG. 5A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408. HDD 400 may be connected to memory 409, such as random access memory (RAM), a nonvolatile memory such as flash memory, read only memory (ROM) and/or other suitable electronic data storage.

Referring now to FIG. 5B, the present invention may be embodied in a high definition television (HDTV) 420. The present invention may implement either or both signal processing and/or control circuits, which are generally identified in FIG. 5B at 422, a WLAN interface 429 and/or mass data storage 427 of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 5A. The HDD may be a mini HDD that includes one or more platters having a diameter that is smaller than approximately 1.8". HDTV 420 may be connected to memory 428 such as RAM, ROM, nonvolatile memory such as flash memory and/or other suitable electronic data storage. HDTV 420 also may support connections with a WLAN via a WLAN network interface 429.

Figure 5D:
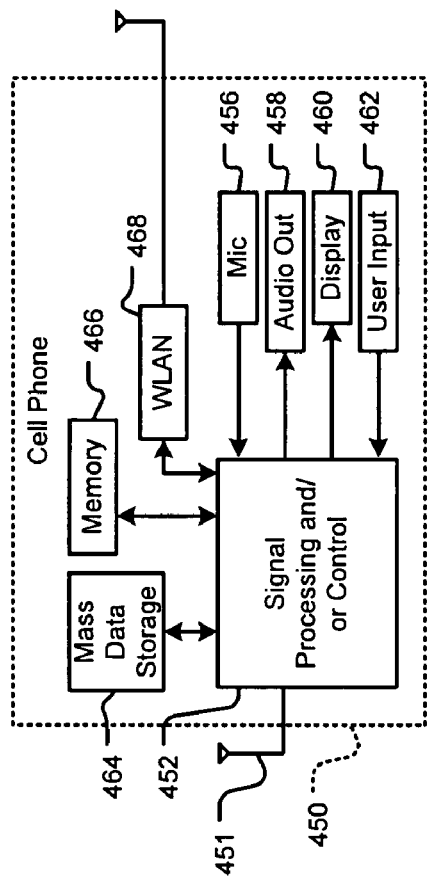
FIG. 5D is a block diagram showing an embodiment of the invention in a cellular or mobile phone.
Figure 5C:
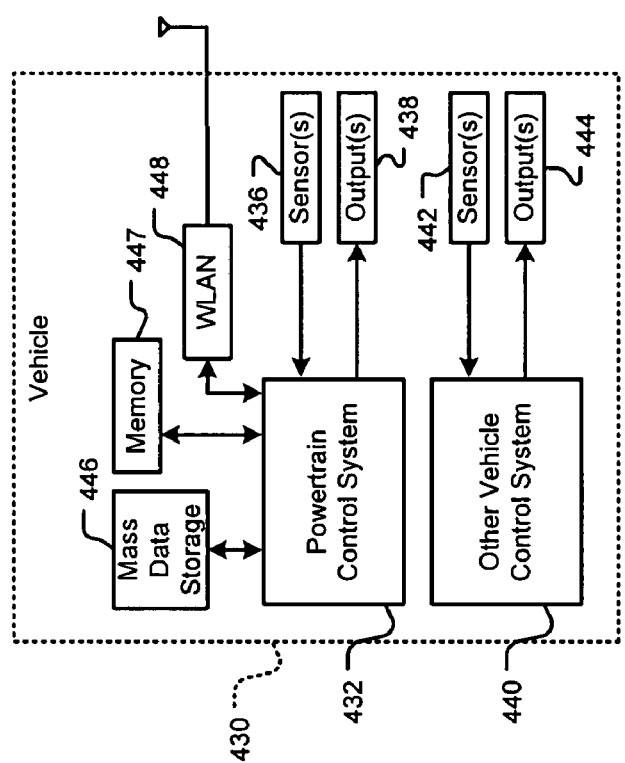
FIG. 5C is a block diagram showing an embodiment of the invention in a vehicle control system.

Referring now to FIG. 5C, the present invention implements a control system of a vehicle 430, a WLAN interface 448 and/or mass data storage 446 of the vehicle control system. In some implementations, the present invention implements a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 5A. The HDD may be a mini HDD that includes one or more platters having a diameter that is smaller than approximately 1.8". Powertrain control system 432 may be connected to memory 447 such as RAM, ROM, nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Referring now to FIG. 5D, the present invention may be embodied in a cellular phone 450 that may include a cellular antenna 451. The present invention may implement either or both signal processing and/or control circuits, which are generally identified in FIG. 5D at 452, a WLAN interface 468 and/or mass data storage 464 of the cellular phone 450. In some implementations, cellular phone 450 includes a microphone 456, an audio output 458 such as a speaker and/or audio output jack, a display 460 and/or user input 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 5A. The HDD may be a mini HDD that includes one or more platters having a diameter that is smaller than approximately 1.8". Cellular phone 450 may be connected to memory 466 such as RAM, ROM, nonvolatile memory such as flash memory and/or other suitable electronic data storage. Cellular phone 450 also may support connections with a WLAN via a WLAN network interface 468.

Figure 5F:
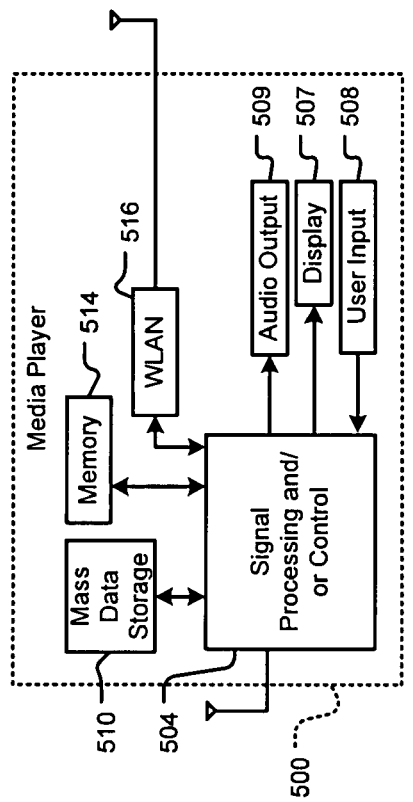
FIG. 5F is a block diagram showing an embodiment of the invention in a media player.
Figure 5E:
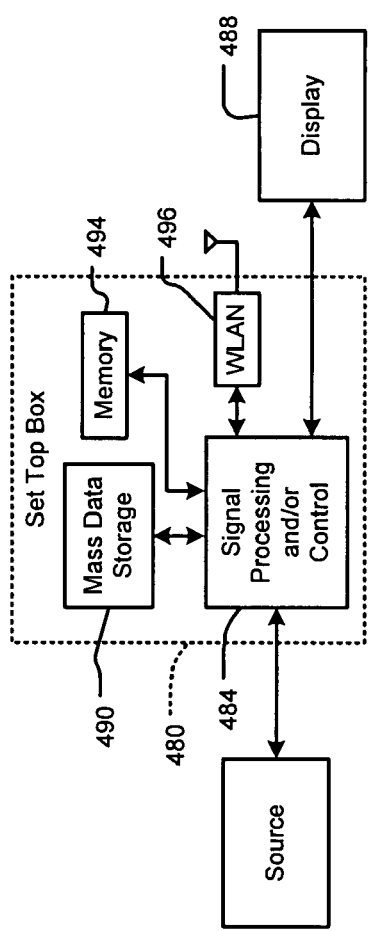
FIG. 5E is a block diagram showing an embodiment of the invention in a set-top box (STB).

Referring now to FIG. 5E, the present invention may be embodied in a set top box 480. The present invention may implement either or both signal processing and/or control circuits, which are generally identified in FIG. 5E at 484, a WLAN interface 496 and/or mass data storage 490 of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 5A. The HDD may be a mini HDD that includes one or more platters having a diameter that is smaller than approximately 1.8". Set top box 480 may be connected to memory 494 such as RAM, ROM, nonvolatile memory such as flash memory and/or other suitable electronic data storage. Set top box 480 also may support connections with a WLAN via a WLAN network interface 496.

Referring now to FIG. 5F, the present invention may be embodied in a media player 500. The present invention may implement either or both signal processing and/or control circuits, which are generally identified in FIG. 5F at 504, a WLAN interface 516 and/or mass data storage 510 of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices for example hard disk drives HDD and/or DVDs. At least one HDD may have the configuration shown in FIG. 5A. The HDD may be a mini HDD that includes one or more platters having a diameter that is smaller than approximately 1.8". Media player 500 may be connected to memory 514 such as RAM, ROM, nonvolatile memory such as flash memory and/or other suitable electronic data storage. Media player 500 also may support connections with a WLAN via a WLAN network interface 516. Still other implementations in addition to those described above are contemplated.

Figure 5G:
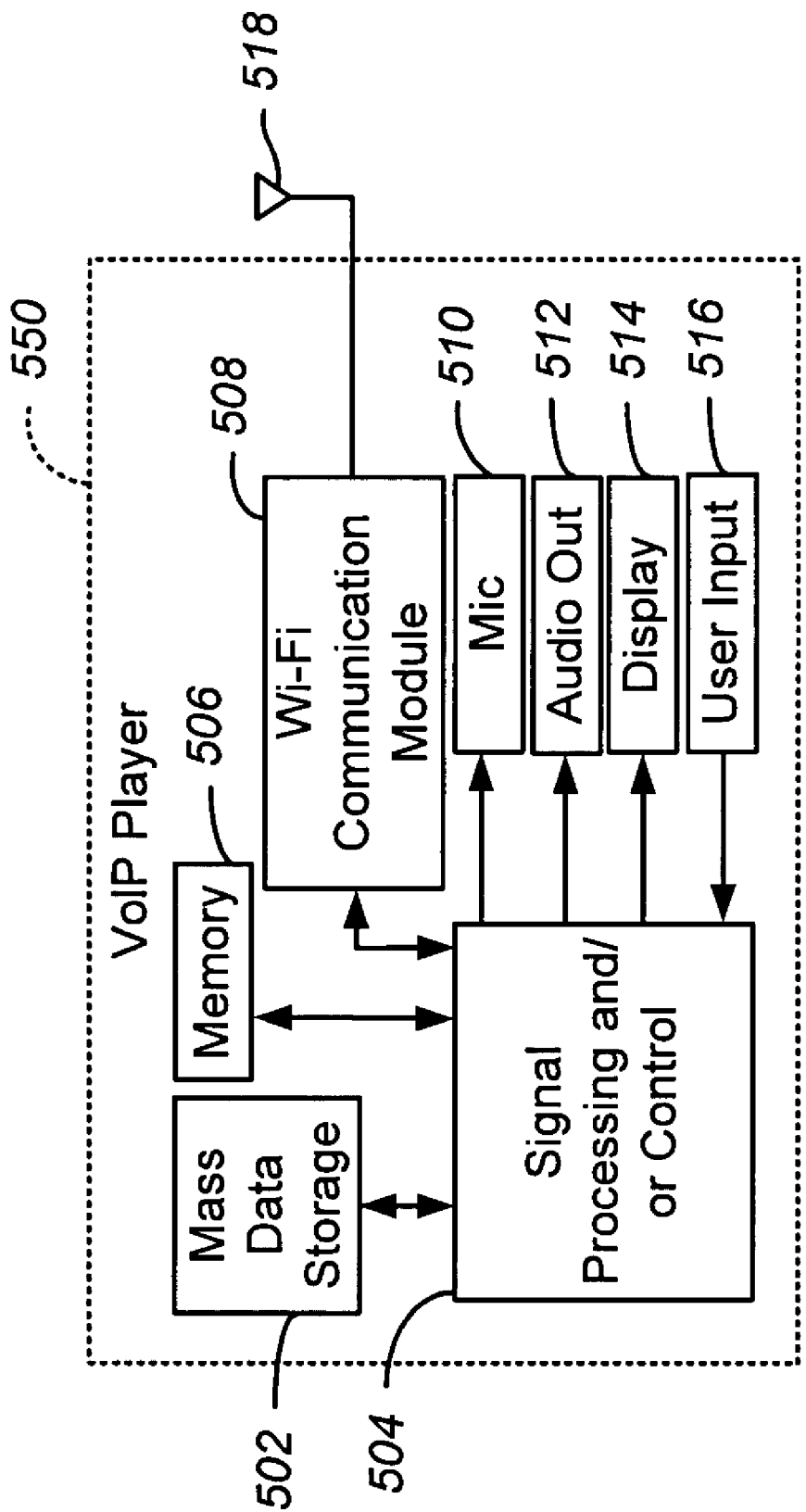
FIG. 5G is a block diagram showing an embodiment of the invention in a voice over IP (VoIP) phone.

Referring to FIG. 5G, the present invention may be embodied in a Voice over Internet Protocol (VoIP) phone 550 that may include an antenna 518. The present invention may implement either or both signal processing and/or control circuits, which are generally identified in FIG. 5G at 504, a wireless interface and/or mass data storage of the VoIP phone 550. In some implementations, VoIP phone 550 includes, in part, a microphone 510, an audio output 512 such as a speaker and/or audio output jack, a display monitor 514, an input device 516 such as a keypad, pointing device, voice actuation and/or other input devices, and a Wireless Fidelity (Wi-Fi) communication module 508. Signal processing and/or control circuits 504 and/or other circuits (not shown) in VoIP phone 550 may process data, perform coding and/or encryption, perform calculations, format data and/or perform other VoIP phone functions.

VoIP phone 550 may communicate with mass data storage 502 that stores data in a nonvolatile manner such as optical and/or magnetic storage devices, for example hard disk drives HDD and/or DVDs. At least one HDD may have the configuration shown in FIG. 5A. The HDD may be a mini HDD that includes one or more platters having a diameter that is smaller than approximately 1.8". VoIP phone 550 may be connected to memory 506, which may be a RAM, ROM, low latency nonvolatile memory such as flash memory and/or other suitable electronic data storage. VoIP phone 550 is configured to establish communications link with a VoIP network (not shown) via Wi-Fi communication module 508.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for biasing an RMR with constant power, comprising:
    applying voltages across at least two variable resistors, which are coupled on opposing ends of the RMR, to establish a current to the RMR, wherein the current is based on the voltages and on resistance values of the at least two variable resistors;

amplifying a voltage corresponding to the established current of the RMR;
comparing the amplified voltage to a reference voltage, wherein the reference voltage is based on a target power for the RMR; and
modifying the resistance values of the at least two variable resistors so that the amplified voltage approaches the reference voltage.

2. A method according to claim 1, wherein the voltages are associated with a dummy resistance value, and wherein the dummy resistance value provides a reference resistance for the RMR.

3. A method according to claim 1, wherein the reference voltage is selected from a bit-selectable threshold.

4. A method according to claim 1, wherein the voltages are applied using operational amplifiers.

5. A method according to claim 1, wherein the resistance values of the at of the RMR.

6. A method according to claim 1, wherein in the amplifying step, the voltage is gain amplified using the resistance values of the at least two variable resistors and an additional resistance value.

7. A method according to claim 6, wherein the voltage is amplified using switch cab amplification.

8. A circuit for biasing an RMR with constant power, comprising:
at least two operational amplifiers;
at least two variable resistors coupled on opposing ends of the RMR, wherein the at least two operational amplifiers respectively apply voltages to the at least two variable resistors to establish a current to the RMR, and wherein the current is based on the voltages and on resistance values of the at least two variable resistors;
a variable gain amplifier for amplifying a voltage corresponding to the established current of the RMR;
a comparator for comparing the amplified voltage to a reference voltage, wherein the reference voltage is based on a target power for the RMR; and
a control logic unit for modifying the resistance values of the at least two variable resistors so that the amplified voltage approaches the reference voltage.

9. A circuit according to claim 8, wherein the voltages are associated with a resistance value of a dummy MR head, and wherein the resistance value of the dummy MR head provides a reference resistance for the RMR.

10. A circuit according to claim 8, wherein the reference voltage is selected from a bit-selectable threshold.

11. A circuit according to claim 8, wherein the resistance values of the at least two variable resistors are between 20 to 40 times greater than a resistance value of the RMR.

12. A circuit according to claim 8, the variable gain amplifier uses the resistance values of the at least two variable resistors and an additional resistance value to amplify the voltage.

13. A circuit according to claim 12, wherein the voltage is amplified using switch cab amplification.

14. An apparatus for biasing an RMR with constant power, comprising:
means for applying voltages across at least two variable resistors, which are coupled on opposing ends of the RMR, to establish a current to the RMR, wherein the current is based on the voltages and on resistance values of the at least two variable resistors;
means for amplifying a voltage corresponding to the established current of the RMR;
means for comparing the amplified voltage to a reference voltage, wherein the reference voltage is based on a target power for the RMR; and
means for modifying the resistance values of the at least two variable resistors so that the amplified voltage approaches the reference voltage.

15. An apparatus according to claim 14, wherein the voltages are associated with a dummy resistance value, and wherein the dummy resistance value provides a reference resistance for the RMR.

16. An apparatus according to claim 14, wherein the reference voltage is selected from a bit-selectable threshold.

17. An apparatus according to claim 14, wherein the means for applying the voltages are at least two operational amplifiers.

18. An apparatus according to claim 14, wherein the resistance values of the at least two variable resistors are between 20 to 40 times greater than a resistance value of the RMR.

19. An apparatus according to claim 14, wherein the means for amplifying uses gain amplification to amplify the voltage, the gain amplification using the resistance values of the at least two variable resistors and an additional resistance value.

20. An apparatus according to claim 19, wherein the means for amplifying uses switch cab amplification to amplify the voltage.

21. A method for biasing an RMR with constant power, comprising:
generating a current to the RMR;
amplifying a voltage corresponding to the generated current of the RMR;
comparing the amplified voltage to a reference voltage, wherein the reference voltage is based on a target power for the RMR; and
adjusting the amplified voltage to approach the reference voltage;
wherein the generating step applies voltages across at least two variable resistors, which are coupled on opposing ends of the RMR, to generate the current to the RMR, and wherein the current is based on the voltages and on resistance values of the at least two variable resistors.

22. A method according to claim 21, wherein the adjusting step modifies the resistance values of the at least two variable resistors so that the amplified voltage approaches the reference voltage.

23. A method according to claim 21, wherein the voltages are associated with a dummy resistance value, and wherein the dummy resistance value provides a reference resistance for the RMR.

24. A method according to claim 21, wherein the voltages are applied using operational amplifiers.

25. A method according to claim 21, wherein the resistance values of the at least two variable resistors are between 20 to 40 times greater than a resistance value of the RMR.

26. A method according to claim 21, wherein in the amplifying step, the voltage is gain amplified using the resistance values of the at least two variable resistors and an additional resistance value.

27. A method according to claim 26, wherein the voltage is amplified using switch cab amplification.

28. A method according to claim 21, wherein the reference voltage is selected from a bit-selectable threshold.

29. An apparatus for biasing an RMR with constant power, comprising:
a generator for generating a current to the RMR;
an amplifier for amplifying a voltage corresponding to the generated current of the RMR;

a comparator for comparing the amplified voltage to a reference voltage, wherein the reference voltage is based on a target power for the RMR; and an adjuster for adjusting the amplified voltage to approach the reference voltage;

wherein the generator applies voltages across at least two variable resistors, which are coupled on opposing ends of the RMR, to generate the current to the RMR, and wherein the current is based on the voltages and on resistance values of the at least two variable resistors.

30. An apparatus according to claim 29, wherein the adjuster modifies the resistance values of the at least two variable resistors so that the amplified voltage approaches the reference voltage.

31. An apparatus according to claim 29, wherein the voltages are associated with a dummy resistance value, and wherein the dummy resistance value provides a reference resistance for the RMR.

32. An apparatus according to claim 29, wherein the voltages are applied using operational amplifiers.

33. An apparatus according to claim 29, wherein the resistance values of the at least two variable resistors are between 20 to 40 times greater than a resistance value of the RMR.

34. An apparatus according to claim 29, wherein the amplifier uses gain amplification to amplify the voltage, the gain amplification using the resistance values of the at least two variable resistors and an additional resistance value.

35. An apparatus according to claim 34, wherein the voltage is amplified using switch cab amplification.

36. An apparatus according to claim 29, wherein the reference voltage is selected from a bit-selectable threshold.

37. An apparatus for biasing an RMR with constant power, comprising:

means for generating a current to the RMR;

means for amplifying a voltage corresponding to the generated current of the RMR;

means for comparing the amplified voltage to a reference voltage, wherein the reference voltage is based on a target power for the RMR; and means for adjusting the amplified voltage to approach the reference voltage;

wherein the means for generating applies voltages across at least two variable resistors, which are coupled on opposing ends of the RMR, to generate the current to the RMR, and wherein the current is based on the voltages and on resistance values of the at least two variable resistors.

38. An apparatus according to claim 37, wherein the means for adjusting modifies the resistance values of the at least two variable resistors so that the amplified voltage approaches the reference voltage.

39. An apparatus according to claim 37, wherein the voltages are associated with a dummy resistance value, and wherein the dummy resistance value provides a reference resistance for the RMR.

40. An apparatus according to claim 37, wherein the voltages are applied using operational amplifiers.

41. An apparatus according to claim 37, wherein the resistance values of the at least two variable resistors are between 20 to 40 times greater than a resistance value of the RMR.

42. An apparatus according to claim 37, wherein the means for amplifying uses gain amplification to amplify the voltage, the gain amplification using the resistance values of the at least two variable resistors and an additional resistance value.

43. An apparatus according to claim 42, wherein the voltage is amplified using switch cab amplification.

44. An apparatus according to claim 37, wherein the reference voltage is selected from a bit-selectable threshold.

* * * * *